United States Patent [19]

Harbeke

[11] Patent Number: 4,848,043

[45] Date of Patent: Jul. 18, 1989

[54] UNDER FLOOR FIRE STOP COUPLING AND METHOD

[76] Inventor: Gerold J. Harbeke, 2087 S. Military Trail, West Palm Beach, Fla. 33415

[21] Appl. No.: 243,963

[22] Filed: Sep. 14, 1988

[51] Int. Cl.[4] .............................................. F16K 13/00
[52] U.S. Cl. ........................................ 52/1; 52/232; 52/745; 137/75
[58] Field of Search ................ 52/317, 220, 232, 573, 52/1, 745; 285/158; 137/75, 77, 362

[56] References Cited

U.S. PATENT DOCUMENTS

| | | | |
|---|---|---|---|
| 4,109,423 | 8/1978 | Perrain | 52/1 |
| 4,136,707 | 1/1979 | Gaillot et al. | 137/75 |
| 4,221,092 | 9/1980 | Johnson | 52/232 |
| 4,307,546 | 12/1981 | Dolder | 52/232 |
| 4,538,389 | 9/1985 | Heinen | 52/232 |
| 4,642,956 | 2/1987 | Harbeke | 52/232 |
| 4,669,759 | 6/1987 | Harbeke | 52/220 |

OTHER PUBLICATIONS

3M Publication (Fire Barrier Restricting Collar RC-1).

Primary Examiner—David A. Scherbel
Assistant Examiner—Caroline D. Dennison
Attorney, Agent, or Firm—Griffin, Branigan & Butler

[57] ABSTRACT

An under-floor fire-stop coupling and method of construction involves a pipe coupling assembly (10) in which an elongated tubularly-shaped main body (14) has a rigidly coupled outwardly directed mainbody flange (36) to which a fire-stop metallic band (22) having intumescent material (24) therein is mounted. The metallic band includes tabs (34) at the end adjacent to the main-body flange. The main body defines an anchor indentation (46) in an outer surface above the main-body flange. The pipe coupling assembly is mounted to a floor (40) by preparing a hole (66) through the floor slightly larger than the main body, extending the main body through the hole from below the floor until the main-body flange contacts a bottom surface of the floor, and extending fasteners through the metallic band tab and the mainbody flange into the bottom of the floor. Thereafter, in order to make the floor fire proof, concrete is poured into a space left between the main-body and the hole in the floor and this concrete hardens in the anchoring indentation to hold the pipe coupling assembly in the hole.

8 Claims, 2 Drawing Sheets

UNDER FLOOR FIRE STOP COUPLING AND METHOD

BACKGROUND OF THE INVENTION

This invention relates generally to the art of pipe networks for buildings, and especially to apparatus and systems for making pipe networks fire-retardant.

For a number of years, pipe networks which have extended through floors of building have been made fire retardant by encircling pipes with fire-stop intumescent material which expands upon contact with heat to close off the pipes at the floors. It has been suggested to do this by encircling a pipe with a metal container enclosing intumescent material and fastening this metal container to a bottom surface of a floor through which the pipe passes. However, a difficulty with prior-art systems is that the intumescent material must be installed separately from the pipe and normally must be put in place after the pipe has been extended through holes in floors. Thus, it is an object of this invention to provide an under-floor fire-stop coupling, and method of using the same which can be installed at the same time pipe passing through a floor hole is installed. Other suggestions have been made for casting pipe couplings having intumescent collars thereabout into concrete floors when they are poured. Such "cast-in" couplings having intumescent collars works quite well with poured floors, however, many floors are not poured, but rather are constructed of prefabricated concrete slabs laid on floor trusses or other types of supports. Thus, it is an object of this invention to provide a fire-stop coupling which can be used with pre-fabricated concrete slab floors.

Yet another difficulty with prior-art methods of mounting intumescent collars about pipes below floors with metallic containers is that one pipes are extended through holes in floors, the gaps between the pipes and floors must be filled with a hardening substance or concrete. Normally, it is more convenient to fill these spaces before metallic containers with intumescent materials are placed on pipes below floors because water from hardening cement might go into the intumescent material, thereby damaging it, and a rigid holding surface must be used below the floor to hold the filling concrete in place. It is an object of this invention to provide an under-floor fire-stop coupling and method which allows pipe to be extended through a floor with a metallic container fire-stop device thereon prior to filling the gap between the pipe and a hole through which it passes. Further, it is an object of this invention to provide a device which inherently closes the bottom portion of the gap between the pipe and the hole with a rigid surface for supporting wet concrete placed in the gap.

One problem with prior-art fire-stop intumescent material collars is that workmen must form them at job sites, which is inconvenient. It is therefore an object of this invention to provide a pipe coupling assembly with an intumescent collar which can be prepackaged prior to being transported and sold.

It is a further object of this invention to provide a pipe coupling assembly having an intumescent-material collar which is easy and relatively inexpensive to construct, but yet which is durable and effective in responding to heat.

SUMMARY

According to principles of this invention, an under-floor fire-stop coupling, and method of using the same, involves the use of a pipe coupling with a tubular main body and a integral solid flange extending outwardly from an outer surface of the tubular main body. A tubularly-shaped metallic band having an intumescent collar enclosed therein is located on the tubular main body below the main-body flange. The flange extends radially outwardly significantly further than the tubularly-shaped metallic band and the band has radial metallic-band tabs attached to an upper end thereof adjacent and parallel to the main-body flange. The pipe coupling assembly is attached to a floor of a building by preparing a hole through the floor slightly larger than the tubular main body, extending the tubular main body through the hole from below the floor until the main-body flange contacts a bottom surface of the floor, and extending fasteners through the metallic band tabs and the main-body flange into the bottom of the floor. The main body also includes an indentation anchor on its outer surface so that a gap between the hole in the floor and the outer surface of the main body can be filled with a hardening mixture to anchor the main body in place. In one embodiment, a portion of the main-body flange, is molded as one piece with the main body. Also in an embodiment, a metallic ring forms an outer portion of the main-body flange.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
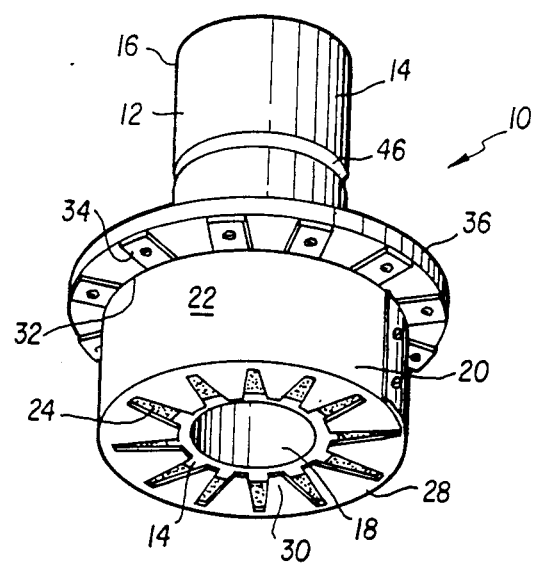
FIG. 1 is an isometric view of a pipe coupling assembly of this invention.
Figure 2:
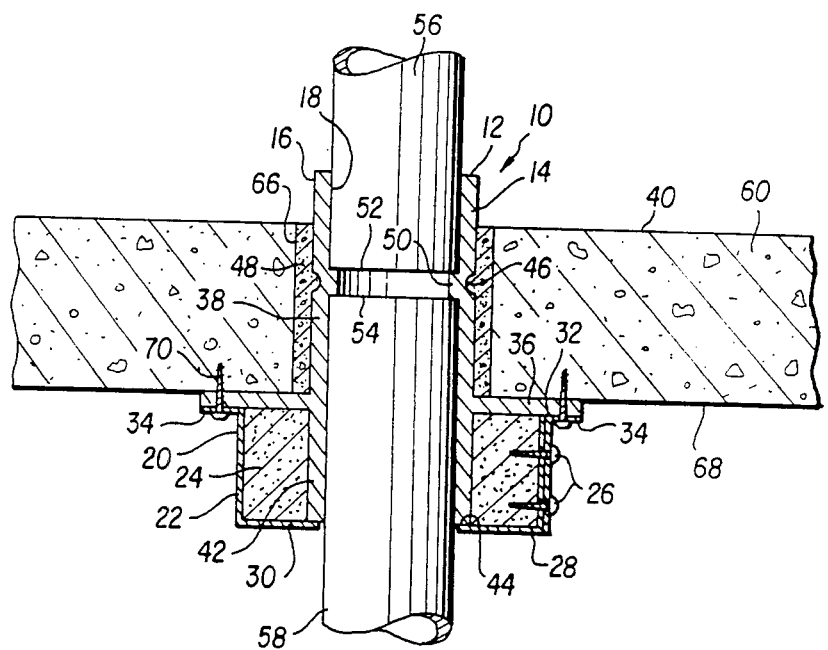
FIG. 2 is a cross sectional view of the pipe coupling assembly of FIG. 1 mounted on a floor and receiving pipes from opposite ends thereof.

Referring now to FIGS. 1 & 2, an under-floor pipe coupling assembly 10 comprises a pipe coupling 12 having a tubular main body 14 with an outer surface 16 and an inner surface 18. The pipe coupling assembly 10 further comprises a fire-stop collar 20 including a metallic band 22 and intumescent material 24. The metallic band 22 is wrapped into a tubular shape with the ends of the metallic band being attached together by rivets or screws 26. At a lower end 28 thereof the metallic band 22 includes inwardly directed tabs 30 to support the intumescent material 24 and to receive and conduct heat throughout the metallic band 22. At an upper end 32 of the metallic band 22 are outwardly directed tabs 34 which are adjacent to a main-body flange 36. The main-body flange 36 in a preferred embodiment, is molded as one piece with the tubular main body 14 of the pipe coupling 12 and is positioned so that an upper main body portion 38 extending above the main-body flange 36 has a length at least as great as the thickness of a floor 40 with which the pipe coupling assembly is to be used but not much greater. A lower main body portion 42 extending below the main body flange 36 is sufficiently long that the fire-stop collar 20 can be mounted thereon and the lower end 28 of the fire-stop collar is approximately located at a lower end 44 of the lower main body portion 42 but not much longer.

The upper main body portion 38 has on the outer surface 16 thereof an anchoring indentation 46 in which a hardening cement 48 hardens to anchor the pipe coupling assembly 10 in position in a floor. On the inner surface 18 of the pipe coupling 12 is a ring-shaped stop 50 which is molded as one piece with the tubular main body 14. The stop 50 contacts ends 52 and 54 of pipes 56 and 58 respectively received by the tubular main body 14 once the pipe coupling assembly 10 is mounted on the floor 40.

In one embodiment of a coupling for 3 inch pipe the main-body flange 36 has an outer diameter of about 7 inches while the outer diameter of the metallic band 22 is only about 5 inches. Thus, it can be seen that the main-body flange 36 and the metal tabs 34 extend outwardly significantly further than the outer surface of the metallic band 22. In this embodiment the tubular main body extends about 2⅜ inches below the main body flange 36 and between 3 and 10 inches above the flange.

The method of using the pipe coupling assembly 10 will now be described with reference to FIG. 2 which depicts the floor 40 comprising pre-cast, light-weight (4" thick for example), concrete slabs 60 supported at their edges (not shown). Once the pre-cast concrete slabs 60 are in place, a core hole is bored through the pre-cast concrete slab 60 which is somewhat larger than the outer surface 16 of the tubular main body 14. Thereafter, the upper main body portion 38 of the tubular main body 14 is inserted through the core hole 66 from the bottom of the floor 40 until an upper surface of the main-body flange 36 contacts a lower surface 68 of the floor 40. It should be understood, that the fire-stop collar 20 is rigidly mounted on the pipe coupling 12, both by friction caused by internal pressure of the metallic band 22 pressing radially inwardly and by an adhesive placed between the intumescent material 24 and the outer surface of the lower main body portion 42. In any event, once the main-body flange 36 is against the floor 40, fasteners 70 are driven through the outwardly directed tabs 34 of the metallic band 22 and the main body flange 36 into the bottom of the floor 40. In the depicted example, the fasteners 70 are driven into the precast concrete slab 60. Once the pipe coupling assembly 10 is held in place by the fasteners 70, the hardening cement 48 can be placed in a gap between the floor 40 and the upper main body portion 38 of the tubular main body 14. This cement 48 will eventually harden in the anchoring indentations 46 to hold the pipe coupling assembly 10 firmly in place in the floor 40. During this hardening, water from hardening cement 48 is prevented from reaching the intumescent material 24 by the main-body flange 36. In this respect, both the tubular main-body 14 and the main-body flange 36 are constructed of the same material as are plastic pipe (e.g. PVC or ABS) and in the preferred embodiment, are molded as one piece together. As can be seen in FIG. 1, the main-body flange 36 forms a complete solid ring about the tubular main body 14. Once the hardening cement 48 has been poured into the gap, the pipe coupling 12 can receive the pipes 56 and 58 in the ends thereof until they come into contact with the stop 50. The pipes can be put in place at any time after mounting of the pipe coupling assembly 10 has been completed.

Figure 3:
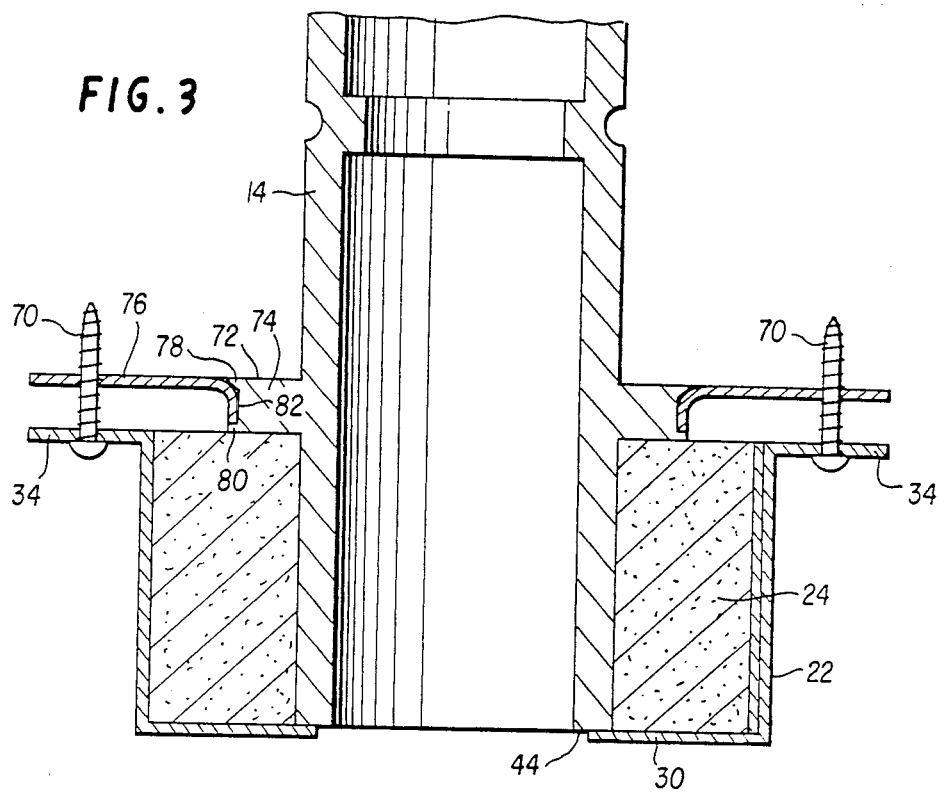
FIG. 3 is a cross sectional view of an alternate embodiment of this invention.

The embodiment of FIG. 3 is very much as the embodiments of FIGS. 1 and 2 with the exception that a main-body flange 72 thereof is only partially constructed of the same material as is the tubular main-body 14. In this respect, the main-body flange 72 includes an inner stub 74 which snaps to a metallic outer washer 76. In this regard, the inner stub 74 includes a stop 78 on an upper edge thereof and a small shoulder 80 on a lower edge thereof. The lower shoulder 80 is sufficiently small that the outer metallic washer 76 can be snapped thereover so that the washer 76 is held in a trough 82 between the stop 78 and the lower shoulder 80. It should be noted that the metallic outer washer 76 extends from a position inside the intumescent material 24 to outside the metallic band 22. Thus, if a fire occurs in a room below a floor on which the pipe coupling assembly of FIG. 3 is mounted by the fasteners 70 in the manner depicted in FIG. 2, the fire will not come into contact with a plastic portion of the main-body flange 72 but rather will come into contact with the outer metallic washer 76. Thus, the fire cannot immediately melt the complete flange 72 and can therefore not go around the outer directed tabs 34 up through a bore in the tubular main body 14. Of course, the intumescent material 24 will expand closing off the lower end 44 of the tubular main body 14 in the same manner as the pipe coupling assembly 10 functions in the FIG. 2 embodiment.

Figure 4:
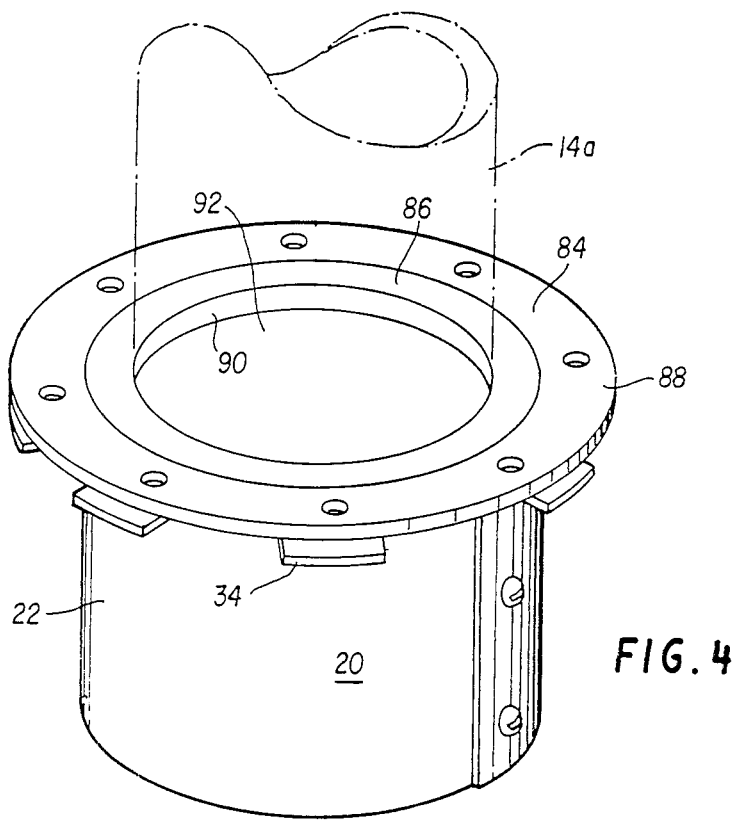
FIG. 4 is an isometric view of a segmented portion of another alternate embodiment of this invention.

Looking now at an embodiment depicted in FIG. 4, FIG. 4 depicts only a segmented portion of this embodiment, with a tubular main body 14a thereof being shown in phantom. This embodiment includes a flange 84 having a plastic inner stub 86 and an outer metallic washer 88 in the same manner as in the FIG. 3 embodiment, however, in the FIG. 4 embodiment, a radially inwardly directed surface 90 of the flange 84 is not originally molded as one piece with the tubular main body 14a but rather is solvent welded thereto in a factory. A fire-stop collar 20, identical to those already described, is attached to the main body 14a immediately below the solvent welded flange 84 in the same manner as already described. A well-known dissolving material, or solvent is placed on the radially inwardly directed surface 90 of the flange 84 and a short stub of pipe, or main body 14a, is inserted through a bore 92 of the flange 84. The dissolving material or solvent dissolves both the plastic inner flange stub 86 and the main body 14a. Once the flange 84 is mounted on the outer surface of the main body 14a, the dissolved materials harden together so that the inner flange stub 86 becomes a part of the main body 14a. Thereafter, the fire-stop collar 20 is mounted on the main body 14a in the manner described for the other embodiments. The apparatus depicted in FIG. 4 thus becomes basically a pipe coupling assembly of the same type depicted in FIGS. 1 & 2.

It is noted that under certain circumstances the FIG. 4 embodiment might be less expensive to manufacture then the other embodiments because it does not require a special mold to produce a special flanged coupling of this invention as do the other embodiments described herein. In this regard, however, a flange could be solvent welded on a short piece of standard pipe rather than on a coupling.

It will be appreciated by those of ordinary skill in the art that the under-floor pipe-stop coupling and method described herein allow one to easily mount both a pipe and a fire-stop collar at a lower surface of a floor in one step and further this assembly and method allow one to easily fill a gap left between a pipe and a hole bored in the floor, without damaging intumescent material in the collar. It will be appreciated by those of ordinary skill in the art that this invention is extremely uncomplicated and allows one to construct under-floor fire-stop couplings in a factory embodiment, rather than at a work site.

While the invention has been particularly shown and described with reference to a preferred embodiment, it will be understood by those skilled in the art that various changes in form and detail may be made therein without departing from the spirit and scope of the invention. For example, the pipe coupling assembly 10 could be mounted to a floor having a wooden bottom surface by nailing it to the wood.

The embodiments of the invention in which an exclusive property or privilege are claimed are defined as follows:

1. An under-floor fire-stop coupling assembly for use with a floor of a building comprising:
   a pipe coupling having an elongated tubularly-shaped main body with first and second ends, said elongated tubularly-shaped main body having an inner surface and an outer surface, said pipe coupling receiving pipes in opposite ends thereof, said pipe coupling including on an outer surface of the main body thereof an outwardly directed main-body flange rigidly coupled to said main body, said main body extending above said main-body flange a distance at least as great as the thickness of a floor with which the pipe coupling is to be used and extending below said main body flange for a distance sufficiently great for mounting an intumescent fire-stop collar on the outer surface thereof;
   an intumescent fire-stop collar wrapped about and attached to the outer surface of said tubularly-shaped main body below said flange, said intumescent collar being constructed of a material which expands when it gets hot to close off the inner surface of said tubularly-shaped main body; and
   a closed tubularly-shaped metallic band wrapped about and attached to a circumferential periphery of said intumescent collar immediately adjacent to said main-body flange, but said main-body flange extending radially outwardly substantially further than said metallic band;
   a metallic-band tab attached to an upper end of said tubular band adjacent said main-body flange and extending radially outwardly therefrom approximately parallel to, and immediately adjacent to, said main-body flange;
   whereby said pipe coupling assembly can be attached to said floor of said building by preparing a hole through said floor slightly larger than said main-body, extending that portion of the main body above said main-body flange through said hole from below said floor until said main-body flange contacts a bottom surface of said floor, and extending fasteners through said metallic-band tab and said main-body flange into the bottom of said floor.

2. A coupling assembly as in claim 1, wherein a portion of said main-body flange at said main body is molded as one piece with said main-body.

3. A coupling assembly as in claim 2, wherein said elongated tubularly-shaped main body positioned above said main-body flange defines on an outer surface thereof an anchor indentation for receiving a hardening material.

4. A coupling assembly as in claim 3, wherein an outer portion of said main-body flange is constructed of a metal ring.

5. A coupling assembly as in claim 2, wherein an outer portion of said main-body flange is constructed of a metal ring.

6. A coupling assembly as in claim 1, wherein said elongated tubularly-shaped main body positioned above said main-body flange defines on an outer surface thereof an anchor indentation for receiving a hardening material.

7. A coupling assembly as in claim 1, wherein an outer portion of said main-body flange is constructed of a metal ring.

8. A method of constructing a fire-stop pipe coupling through a floor comprising the steps of:
   making a hole in the floor;
   inserting an upper portion of a pipe coupling assembly through the hole from the bottom of said floor, said pipe coupling assembly having an elongated tubularly-shaped main body with first and second ends, said elongated tubularly-shaped main body having an inner surface and an outer surface, said pipe coupling receiving pipes in opposite ends thereof, said pipe coupling including on an outer surface of the main body thereof an outwardly directed main-body flange rigidly coupled to said main body, said man body extending above said main-body flange a distance at least as great as the thickness of a floor with which the pipe coupling is to be used and extending below said main body flange for a distance sufficiently great for mounting an intumescent fire-stop collar on the outer surface thereof said pipe coupling assembly further comprising an intumescent fire-stop collar wrapped about and attached to the outer surface of said tubularly-shaped main body below said flange, said intumescent collar being constructed of a material which expands when it gets hot to close off the inner surface of said tubularly-shaped main body, and said coupling assembly further comprising a closed tubularly-shaped metallic band wrapped about and attached to a circumferential periphery of said intumescent collar immediately adjacent to said main-body flange, but said main-body flange extending radially outwardly substantially further than said metallic band, the coupling assembly further including a metallic-band tab attached to an upper end of said tubular band adjacent said main-body flange and extending radially outwardly therefrom approximately parallel to, an immediately adjacent to, said main-body flange;
   fastening said pipe coupling assembly to said floor by extending fasteners through said tab and said main-body flange into the bottom of the floor;
   pouring a hardening concrete into a gap left between the hole and the floor and the upper main body portion and allowing the concrete to harden.

* * * * *